US011641312B2

(12) United States Patent
Prakash et al.

(10) Patent No.: US 11,641,312 B2
(45) Date of Patent: *May 2, 2023

(54) CONSOLIDATING MANUFACTURING INTELLIGENCE EVENT QUEUE ITEMS

(71) Applicant: AVEVA SOFTWARE, LLC, Lake Forest, CA (US)

(72) Inventors: Ravi Kumar Herunde Prakash, Lake Forest, CA (US); Sami Majed Abbushi, Mission Viejo, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,644

(22) Filed: Aug. 20, 2021

(65) Prior Publication Data
US 2022/0045915 A1 Feb. 10, 2022

Related U.S. Application Data

(63) Continuation of application No. 16/533,261, filed on Aug. 6, 2019, now Pat. No. 11,133,991, which is a continuation of application No. 15/136,290, filed on Apr. 22, 2016, now Pat. No. 10,374,903.

(51) Int. Cl.
H04L 41/16 (2022.01)
H04L 67/60 (2022.01)

(52) U.S. Cl.
CPC .............. H04L 41/16 (2013.01); H04L 67/60 (2022.05)

(58) Field of Classification Search
CPC ......... H04L 41/16; H04L 43/08; H04L 67/10; H04L 67/60

USPC ......................................................... 709/224
See application file for complete search history.

(56) References Cited

U.S. PATENT DOCUMENTS

| | | | |
|---|---|---|---|
| 6,141,412 A * | 10/2000 | Smith | H04M 3/51 379/266.03 |
| 7,302,685 B2 * | 11/2007 | Binns | G06F 9/4887 718/103 |
| 7,647,591 B1 | 1/2010 | Loucks | |
| 8,010,218 B2 * | 8/2011 | McGreevy | G06Q 10/0631 700/121 |
| 8,572,619 B2 * | 10/2013 | Webber | G06F 9/4887 718/103 |
| 11,133,991 B2 * | 9/2021 | Prakash | H04L 41/16 |
| 2006/0190943 A1 * | 8/2006 | Haeri | G06F 9/4887 718/103 |
| 2006/0235786 A1 * | 10/2006 | DiSalvo | G06Q 40/04 705/37 |
| 2006/0242181 A1 | 10/2006 | Mueller-Klingspor | |
| 2006/0271600 A1 | 11/2006 | Goh et al. | |
| 2007/0067373 A1 * | 3/2007 | Higgins | G06Q 30/00 |
| 2007/0143761 A1 * | 6/2007 | Deng | G06F 9/4881 718/103 |
| 2008/0244584 A1 | 10/2008 | Smith et al. | |
| 2010/0082129 A1 * | 4/2010 | McGreevy | G06Q 10/0631 700/83 |

(Continued)

Primary Examiner — Tauqir Hussain
(74) Attorney, Agent, or Firm — Greenberg Traurig, LLP

(57) ABSTRACT

Consolidating events to execute objects to extract, transform, and load data from source systems to a structured data store. An event manager process executing on a server runtime utilizes one or more event properties to determine which events can be consolidated to reduce unnecessary processor utilization.

18 Claims, 12 Drawing Sheets

(56) References Cited

U.S. PATENT DOCUMENTS

| | | | |
|---|---|---|---|
| 2011/0066647 A1 | 3/2011 | Chan et al. | |
| 2011/0185362 A1* | 7/2011 | Webber | G06F 9/4887 |
| | | | 718/103 |
| 2012/0023499 A1* | 1/2012 | Biran | G06F 9/5066 |
| | | | 718/103 |
| 2013/0055276 A1* | 2/2013 | Park | G06F 9/4887 |
| | | | 718/103 |
| 2013/0174047 A1 | 7/2013 | Sivakumar et al. | |
| 2015/0006226 A1* | 1/2015 | Smith | G06Q 10/06313 |
| | | | 705/7.23 |
| 2015/0019065 A1* | 1/2015 | Bollapragada | B64F 5/40 |
| | | | 701/29.1 |
| 2015/0039757 A1* | 2/2015 | Petersen | H04L 63/0227 |
| | | | 709/224 |
| 2016/0011911 A1* | 1/2016 | Rangaraju | G06F 9/5061 |
| | | | 718/104 |
| 2016/0027037 A1* | 1/2016 | Cai | G06Q 30/0246 |
| | | | 705/14.42 |
| 2017/0308412 A1* | 10/2017 | Prakash | G06F 9/4881 |
| 2018/0375953 A1* | 12/2018 | Casassa Mont | H04L 61/5014 |

* cited by examiner

CONSOLIDATING MANUFACTURING INTELLIGENCE EVENT QUEUE ITEMS

RELATED APPLICATIONS

This application is a continuation of U.S. application Ser. No. 16/533,261, filed Aug. 6, 2019, entitled "CONSOLIDATING MANUFACTURING INTELLIGENCE EVENT QUEUE ITEMS", which is a continuation of U.S. application Ser. No. 15/136,290, filed Apr. 22, 2016, entitled "CONSOLIDATING MANUFACTURING INTELLIGENCE EVENT QUEUE ITEMS", now U.S. Pat. No. 10,374,903, the entire contents of which are incorporated herein by reference.

TECHNICAL FIELD

Aspects of the present disclosure generally relate to manufacturing intelligence. More particularly, aspects relate to systems and methods for consolidating event execution.

BACKGROUND

Manufacturing intelligence systems provide graphical representations of information models that are multidimensional data models to represent business logic and relationships between various unstructured source data items. Conventional systems process events in a sequential manner which may result in processing redundant time ranges when there is an overlap between the time ranges of more than one event. The sequential processing of events results in unnecessary processor utilization and a delay in processing event requests.

SUMMARY

Aspects of the disclosure improve operation of computerized manufacturing intelligence systems by reducing extra and unnecessary utilization of processor resources and network bandwidth while handling every event request. Aspects of the disclosure further provide a server runtime environment capable of consolidating queued event items to minimize reprocessing of objects to extract, transform, and load data from source systems to a structured data store.

In an aspect, a computer-implemented method includes performing, by a scheduler process of a runtime environment, one or more system events in accordance with a periodic schedule. An on-demand process of the runtime environment performs one or more user-requested events in response to receiving one or more aperiodic requests for the user events from a user device. An event manager process of the runtime environment consolidates the performance of a plurality of the system events and the user-requested events into performance of a primary event. The runtime environment executes one or more model objects corresponding to process devices in a continuous process in response to the consolidated performance of the plurality of system events and user-requested events.

In another aspect, a server computing device comprises a processor and processor-executable instructions stored on a computer-readable storage medium of the server computing device. The processor-executable instructions include instructions that, when executed by the processor, implement a runtime environment including a scheduler process, an on-demand process, and an event manager process. The runtime environment is adapted to execute model objects corresponding to a process device within a continuous process. The scheduler process implements system events in accordance with a periodic schedule. The on-demand process implements aperiodic user events in response to receiving a request for the user events from a user device. The event manager consolidates implementation of the system events and the user events into implementation of a primary event and the runtime environment executes the model objects in response to the implementation of the primary event.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
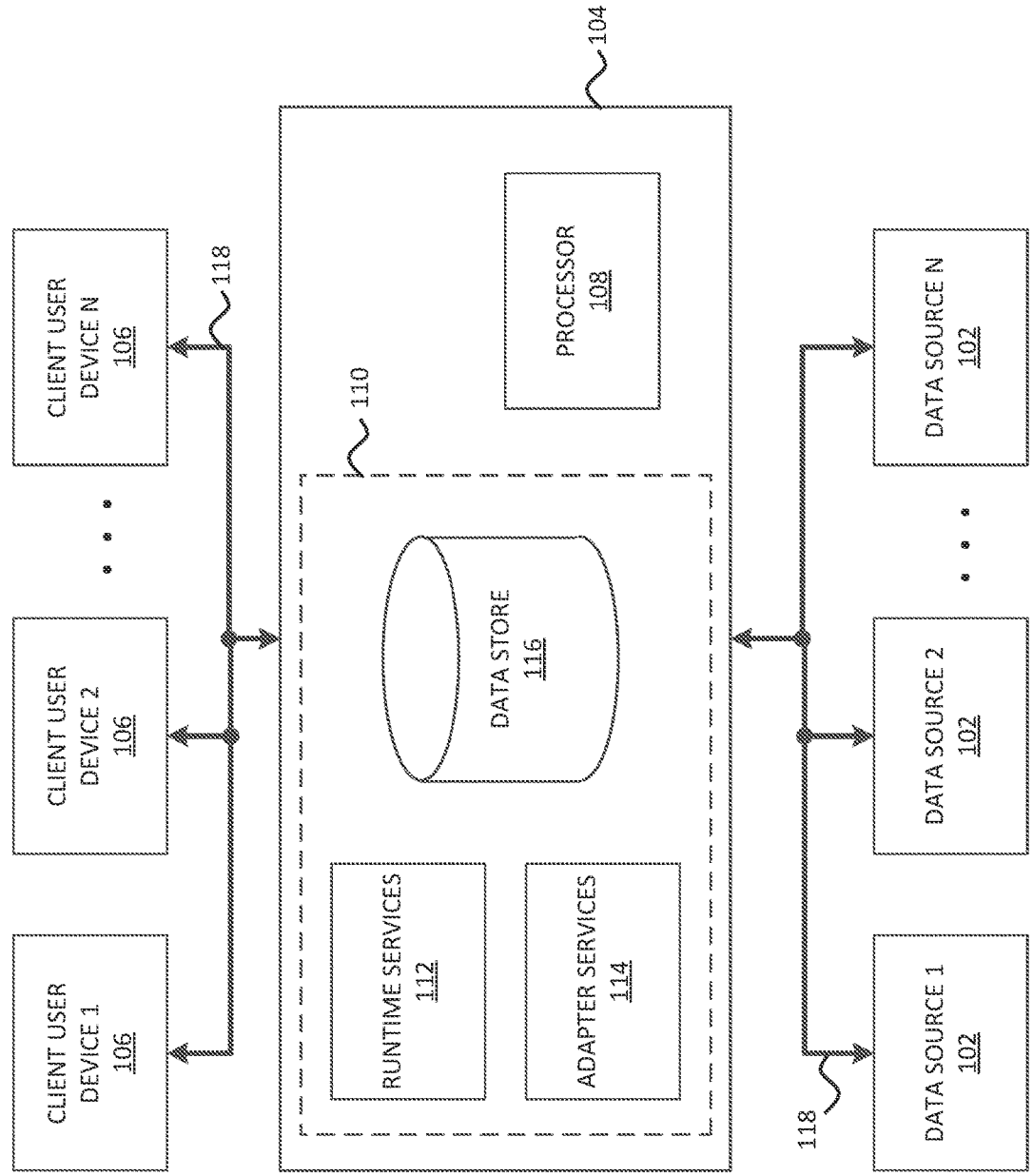
FIG. 1 illustrates an exemplary system within which aspects of the disclosure may be incorporated.

FIG. 1 illustrates an exemplary system, generally indicated at 100, within which an embodiment of the disclosure may be incorporated. The system 100 includes one or more data sources 102, a server computing device 104, and one or more client user devices 106. The server computing device 104 includes a processor 108 and intelligence data services 110. The intelligence data services 110 include runtime services 112, adapter services 114, and a data store 116. In an embodiment, aspects of system 100 are communicatively coupled via a communications infrastructure 118. In accordance with an aspect of the disclosure, intelligence data services 110 are embodied on a computer-readable memory storage device.

The data sources 102 are adapted to store data indicative of one or more values corresponding to devices of a continuous process (e.g., a plant). In an exemplary embodiment, objects (e.g., measures or dimensions) comprise data stored on data sources 102. The data sources 102 are further adapted to provide the stored data to the server computing device 104. In an embodiment, data sources 102 are connected to server computing device 104 via one or more plug-in components, such as data adapters (e.g., adapter services 114). The data sources 102 may each comprise a server computing device, an operational historian database, an object linking and embedding (OLE) database, a performance indicator (PI) historian database, and the like in accordance with an aspect of the disclosure. Exemplary data stored and provided by data sources 102 includes, but is not limited to, operations and performance data, operational historian data, OLE data, PI data, and the like.

The intelligence data services 110 are adapted to, when executed by processor 108, retrieve, relate, and aggregate data from data sources 102. In accordance with an aspect of the disclosure, a measure is a group of one or more calculations that share the same context. In an embodiment, a measure comprises calculations for each source system, time period, and/or each unique combination of dimension value. Exemplary measures include, but are not limited to, sales volume, margin contribution, schedule adherence, energy deviation, performance, quality, run rate, target run rate, utilization, and the like.

In accordance with another aspect of the disclosure, a dimension is a structure that provides context to measures. In an embodiment, each dimension stores related items of data. In another embodiment, a dimension stores contextual data. A dimension enables filtering, grouping, and labeling of measure data, in accordance with an aspect of the disclosure. Exemplary dimensions include, but are not limited to, customer, product, shift, line, machine, equipment, item, job, and the like.

In accordance with a further aspect of the disclosure, relating a measure to a dimension establishes a context. In an embodiment, a context link provides a context for time-slicing and time-slices obtained from time defining dimensions may have an associated context. In an embodiment in which runtime services 112 process a measure, runtime services 112 validate and ensure that only one process is executed during a particular time range.

The communications infrastructure 118 is capable of facilitating the exchange of data among various components of system 100, including data sources 102, server computing device 104, and client user devices 106. The communications infrastructure 118 in the embodiment of FIG. 1 includes a local area network (LAN) that is connectable to other telecommunications networks, including other LANs or portions of the Internet or an intranet. The communications infrastructure 118 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications infrastructure 118 is any medium that allows data to be physically transferred through serial or parallel communication channels (e.g., copper wire, optical fiber, computer bus, wireless communication channel, etc.). In an embodiment, communications infrastructure 118 comprises at least in part a process control network. In another embodiment, communications infrastructure 118 comprises at least in part a SCADA system. In yet another embodiment, communications infrastructure 118 comprises at least in part an enterprise manufacturing intelligence (EMI)/operational intelligence (OI) system.

Figure 2:
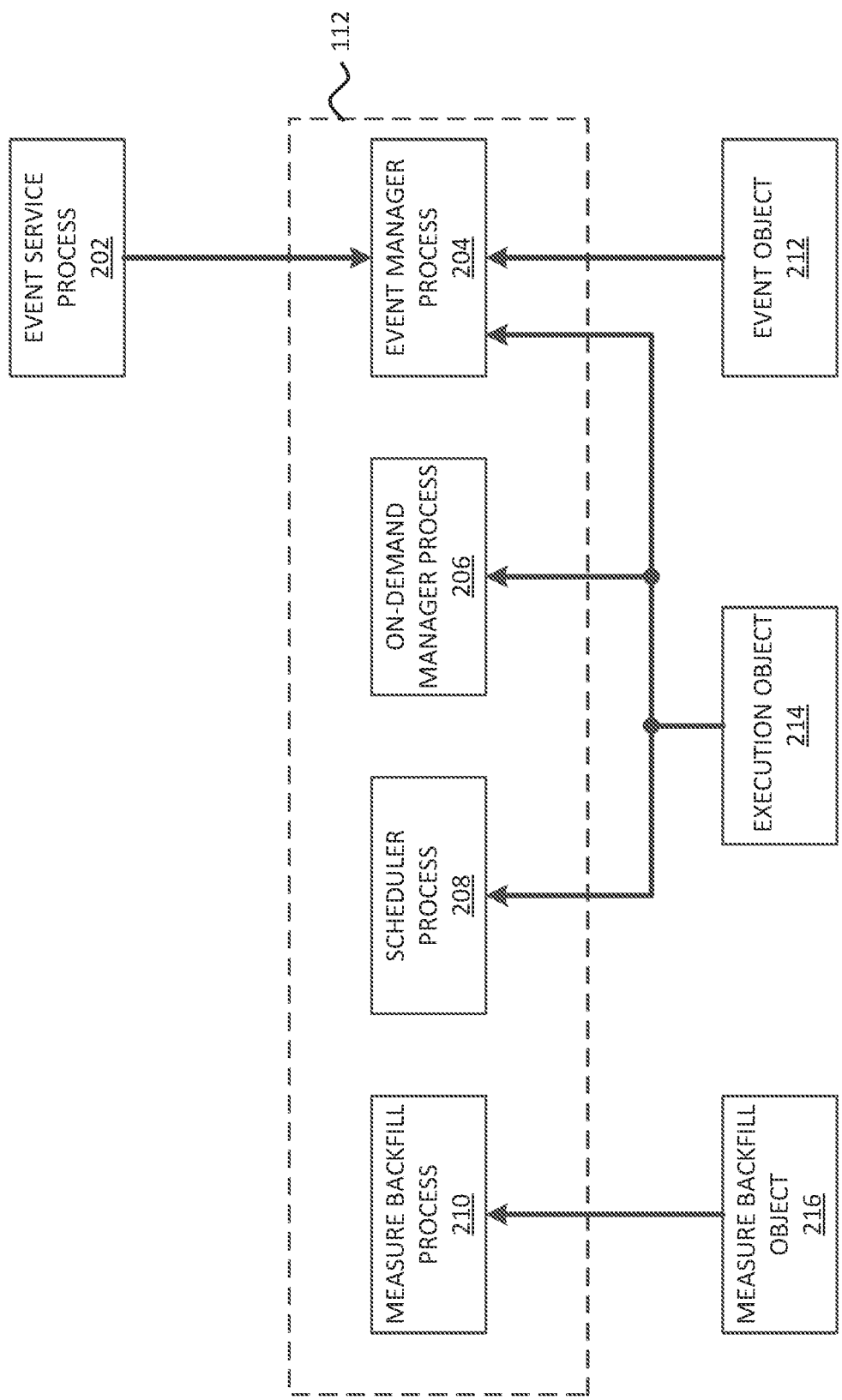
FIG. 2 illustrates an exemplary function block diagram of database processes and objects according to an embodiment.

FIG. 2 illustrates an exemplary system and method for a high-level architecture event in accordance with an aspect of the disclosure. The illustrated embodiment includes an event service process 202, an event manager process 204, an on-demand manager process 206, a scheduler process 208, a measure backfill process 210, an event object 212, an execution object 214, and a measure backfill object 216. In accordance with an embodiment of the disclosure, the event manager process 204, the on-demand manager process 206, the scheduler process 208, and the measure backfill process 210 comprise runtime services 112.

In accordance with an aspect of the disclosure, an external system places an event request (e.g., ad-hoc request, aperiodic request, etc.) to execute a measure or a dimension by calling the event service process 202. In an exemplary embodiment, a client user device 106 transmits an event request to event service process 202 executing on server computing device 104 by calling an add method of the event service process 202. In an embodiment, the event request is referred to as a user-requested event. The event manager process 204, executing on runtime services 112 of server computing device 104, is adapted to interact with event service process 202 for adding events corresponding to event requests. In an embodiment, event manager process 204 processes event requests in a first in, first out (FIFO) order. In accordance with an aspect of the disclosure, supported events include a dimension refresh event, a measure refresh event, and a measure date range execution event.

In accordance with a further aspect of the disclosure, event manager process 204 consolidates system events (e.g., measure backfill process 210, scheduler process 208) and user-requested events. In an embodiment, event manager process 204 consolidates events based on various properties associated with the events such as object type, object identification numbers, target time ranges, and the like as further described herein. Beneficially, aspects of the disclosure automatically consolidate events and do not require users manually adjusting event time ranges for optimized event execution.

In an embodiment in which there are full or partial overlapping time periods for a plurality of events being processed, event manager process 204 utilizes a sequence of events mechanism to pick the event with the superset period that represents all the conflicting events so that a valid and consistent set of time slices are processed as per the model configuration. In an embodiment, aspects of the disclosure enable user-requested events to be raised in any frequency, order, or time as they occur. In an embodiment, event manager process 204 consolidates system events (e.g., Time Defining Dimension (TDD)) with other system and user events by designating primary and secondary events based on time ranges as further described herein. In another embodiment, event manager process 204 consolidates system events (e.g., TDD) with other system and user events by considering the current execution status of the objects to ensure that events which cannot participate in time range consolidation (e.g., system events generated by scheduler process 208) are processed without being affected by consolidation operations, as further described herein. In a further embodiment, event manager process 204 consolidates system events (e.g., TDD) with other system and user events by considering event time ranges that fully overlap, partially overlap, and/or are adjacent, as further described herein. In yet another embodiment, event manager process 204 consolidates system events (e.g., TDD) with other system and user events by creating a consolidated event that fully represents all of the events that it is consolidating without any loss of data.

Referring further to FIG. 2, event manager process 204 executes an add event and/or de-queue event for event object 212 in accordance with an embodiment of the disclosure. In accordance with a further aspect of the disclosure, event manager process 204, on-demand manager process 206, and/or scheduler process 208 captures new execution data when executing a measure, such as execution object 214.

The event manager process 204, on-demand manager process 206, and/or scheduler process 208 also process the measure (e.g., scheduler, time-defining dimension, or event) and check the execution object 214 to avoid overlapping time periods. In accordance with another aspect of the disclosure, measure backfill process 210 captures execution data when executing a measure, such as measure backfill object 216. In an embodiment, event manager process 204, on-demand manager process 206, scheduler process 208, and measure backfill process 210 execute in parallel. In another embodiment, event manager process 204 synchronizes (e.g., coordinates) execution of on-demand manager process 206, scheduler process 208, and measure backfill process 210.

A scheduler (e.g., scheduler process 208), a time-defining dimension (e.g., on-demand manager process 206), an event (e.g., event manager process 204), and/or a backfill (e.g., measure backfill process 210) executes one or more measures in accordance with aspects of the disclosure. In an embodiment, data is captured from data store 116 during an execution time period to avoid the overlapping execution on the runtime (e.g., runtime services 112).

In an embodiment, events process objects (e.g., measures or dimensions) at the same time objects are refreshed by a scheduler (e.g., scheduler process 208), which may cause redundant refreshing of objects. In accordance with an aspect of the disclosure, scheduler process 208 purges objects before they are executed. For example, purging objects avoids redundant refreshing of objects.

In another embodiment, scheduler process 208 purges any event requests that are in a pending status for the same object which is available under an events table (e.g., Model.EventQueue) when there is a refresh of scheduler process 208. The event objects may be dimension objects or measure objects. These objects that are running under scheduler process 208 (e.g., during a scheduler refresh) verifies that the object exists in the events. When the object exists, scheduler process 208 purges the event objects by updating a status of the object to reflect a "purged" identifier and deletes the records from the events table. In an embodiment, the events table is available in data store 116.

In accordance with an aspect of the disclosure, a trigger is available on the events table. In an embodiment, the trigger is disabled by default and enabled upon a command, such as insert, update, delete, and the like. When a user enables the trigger (e.g., via client user devices 106), it will insert the records into the events table. The trigger can also be enabled by making changes in a configuration file (e.g., EMIRuntimeConfigurator.xml, setting an EnableEventQueueHistory key to true). In another embodiment, a table (e.g., Model.EventQueue_History) is utilized to track the status of the objects.

Co-owned U.S. patent application Ser. No. 15/136,138, entitled COORDINATING EVENT-DRIVEN OBJECT EXECUTION, filed Apr. 22, 2016, discloses further aspects of the processes that comprise runtime services 112 and is incorporated herein in its entirety by reference.

Figure 3:
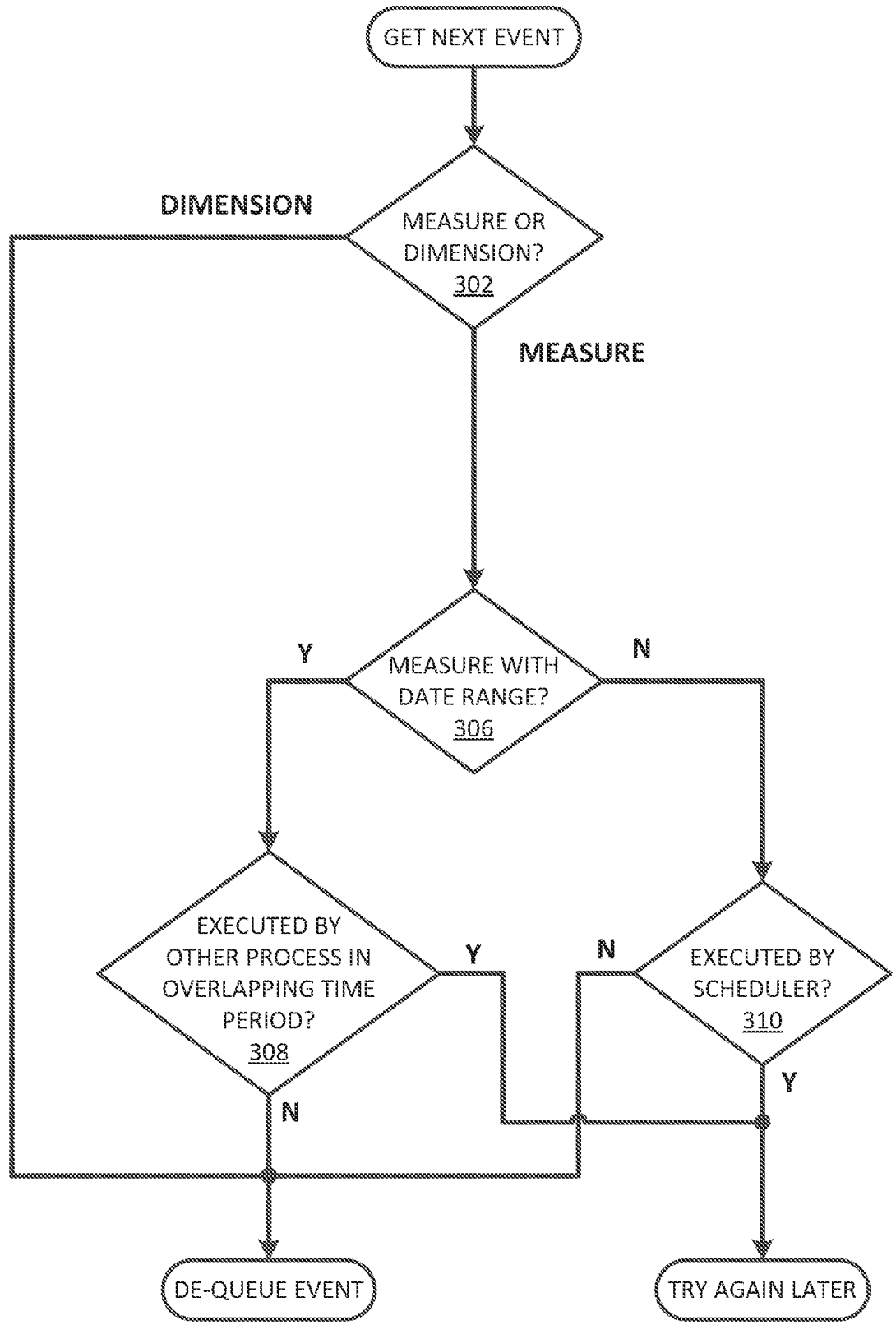
FIG. 3 illustrates an exemplary process to determine whether to initiate an event dequeuing process according to an embodiment.

FIG. 3 illustrates an exemplary procedure, generally indicated at 300, for determining whether to execute a dequeue event process at a current time or at a subsequent time period. In accordance with an aspect of the disclosure, distinct data items are dequeued to prevent re-processing overlapping (e.g., the same) time ranges for a particular object (e.g., measure, dimension) during the same interval. Further aspects of the disclosure prevent dequeuing at least two event requests for the same measure or the same dimension at the same time. The aforementioned aspects of the disclosure have the capability to provide the exemplary benefits of reducing and/or eliminating logical collisions from a process perspective and reducing and/or eliminating blocking scenarios at a database level. In an embodiment, aspects of the present disclosure provide a near real-time processing experience to a user.

Referring further to FIG. 3, event manager process 204 executing procedure 300 (e.g., Model.usp_GetEventQueueItems) dequeues event requests in a first in, first out (FIFO) order and begins by getting the next event request from the queue. In an embodiment, procedure 300 is embodied as processor-executable instructions stored on a computer-readable memory storage device and the event requests are stored as a queue on the computer-readable memory storage device. At step 302, event manager process 204 determines whether the event request is for a measure or a dimension. When event manager process 204 determines the event request is for a dimension (e.g., Event(Model.Event) is a dimension) the procedure continues to dequeue the event via a dequeuing process, as further described herein. When event manager process 204 determines the event request is for a measure (e.g., Event(Model.Event) is a measure) the process continues to step 306. In an embodiment, dimensions and measures are consolidated separately into one of at least three categories of consolidation: dimensions, measures without a date range, and measures with a date range. Accordingly, the consolidation occurs within the category of objects and not across.

At step 306, event manager process 204 determines whether the measure has a date range (e.g., a start date and an end date). In an embodiment, a date range comprises both a date and a time (e.g., a start time on a date and an end time on a date). One having ordinary skill in the art will understand that one or more embodiments may refer to the date range as a time range without departing from the scope of the disclosure. When event manager process 204 determines the measure has a date range, the procedure continues to step 308. At step 308, event manager process 204 determines whether the measure with a date range is executed by another process (e.g., on-demand manager process 206 and/or scheduler process 208 in execution object 214) in a time period that overlaps the date range of the measure. When event manager process 204 determines the measure is not executed by another process in an overlapping time period, the procedure continues to dequeue the event via a dequeuing process, as further described herein. When event manager process 204 determines, at step 308, the measure is executed by another process in an overlapping time period, the procedure processes the measure at a subsequent time period (e.g., it is not dequeued).

Returning to step 306, when event manager process 204 determines the measure does not have a date range, the procedure continues to step 310. At step 310, event manager process 204 determines whether the measure is executed by a scheduler (e.g., scheduler process 208 in execution object 214). When event manager process 204 determines the measure is not executed by the scheduler, the procedure continues to dequeue the event via a dequeuing process, as further described herein. When event manager 204 determines, at step 310, the measure is executed by the scheduler, the procedure processes the measure at a subsequent time period.

Figure 4:
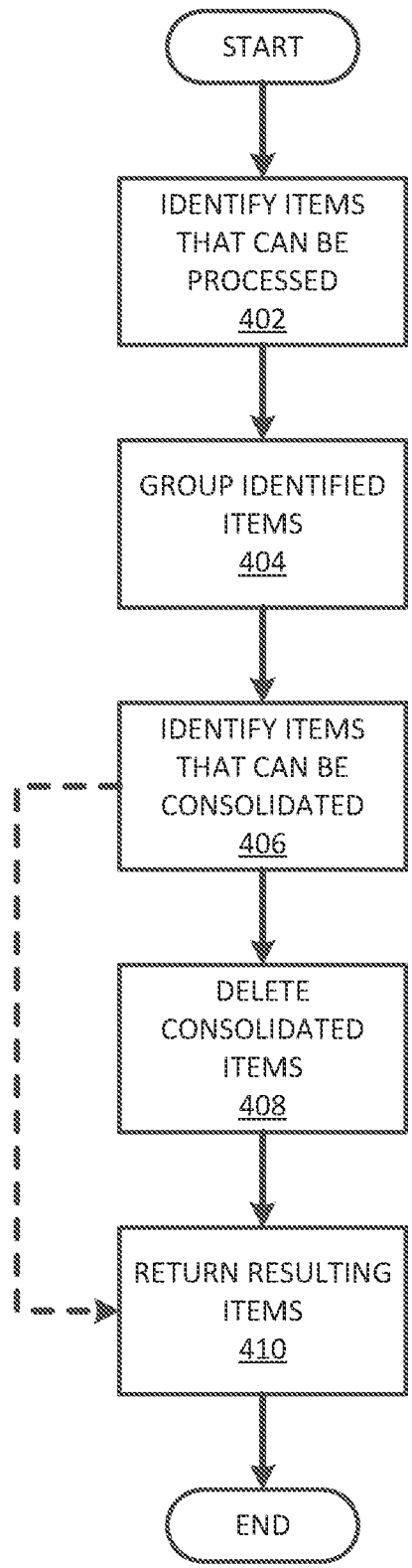
FIG. 4 illustrates an exemplary event dequeuing process according to an embodiment.

FIG. 4 illustrates an exemplary event dequeuing process in accordance with an aspect of the disclosure. At step 402, event manager process 204 identifies a list of one or more event queue items that can be processed, as further described herein. Proceeding to step 404, event manager process 204 groups the list of identified event queue items into primary event queue items and secondary event queue items, as further described herein, and proceeds to step 406. At step 406, event manager process 204 identifies secondary event queue items that can be consolidated with primary event queue items, as further described herein. In an embodiment in which event manager process 204 does not identify any secondary event queue items that can be consolidated, event manager process 204 proceeds to return a distinct set of event queue items at step 410, as further described herein. In an embodiment in which event manager process 204 identifies at least one secondary event queue item that can be consolidated, event manager process 204 continues to step 408. Event manager process 204 deletes consolidated secondary event queue items at step 408 and proceeds to return a distinct set of event queue items at step 410, as further described herein.

Figure 5A:
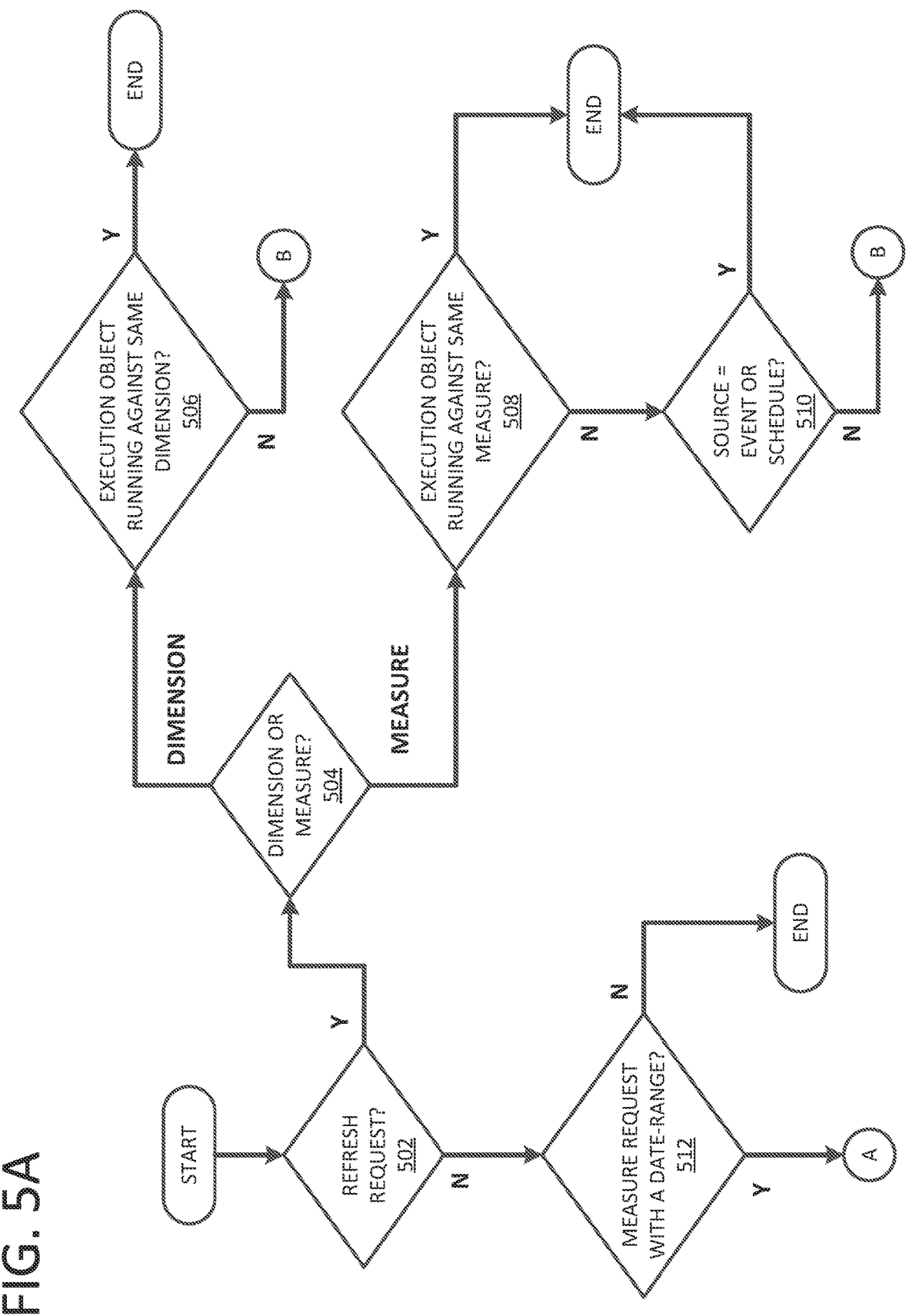
FIGS. 5A-C illustrate an exemplary process to identify event queue items that can be processed according to an embodiment.
Figure 5B:
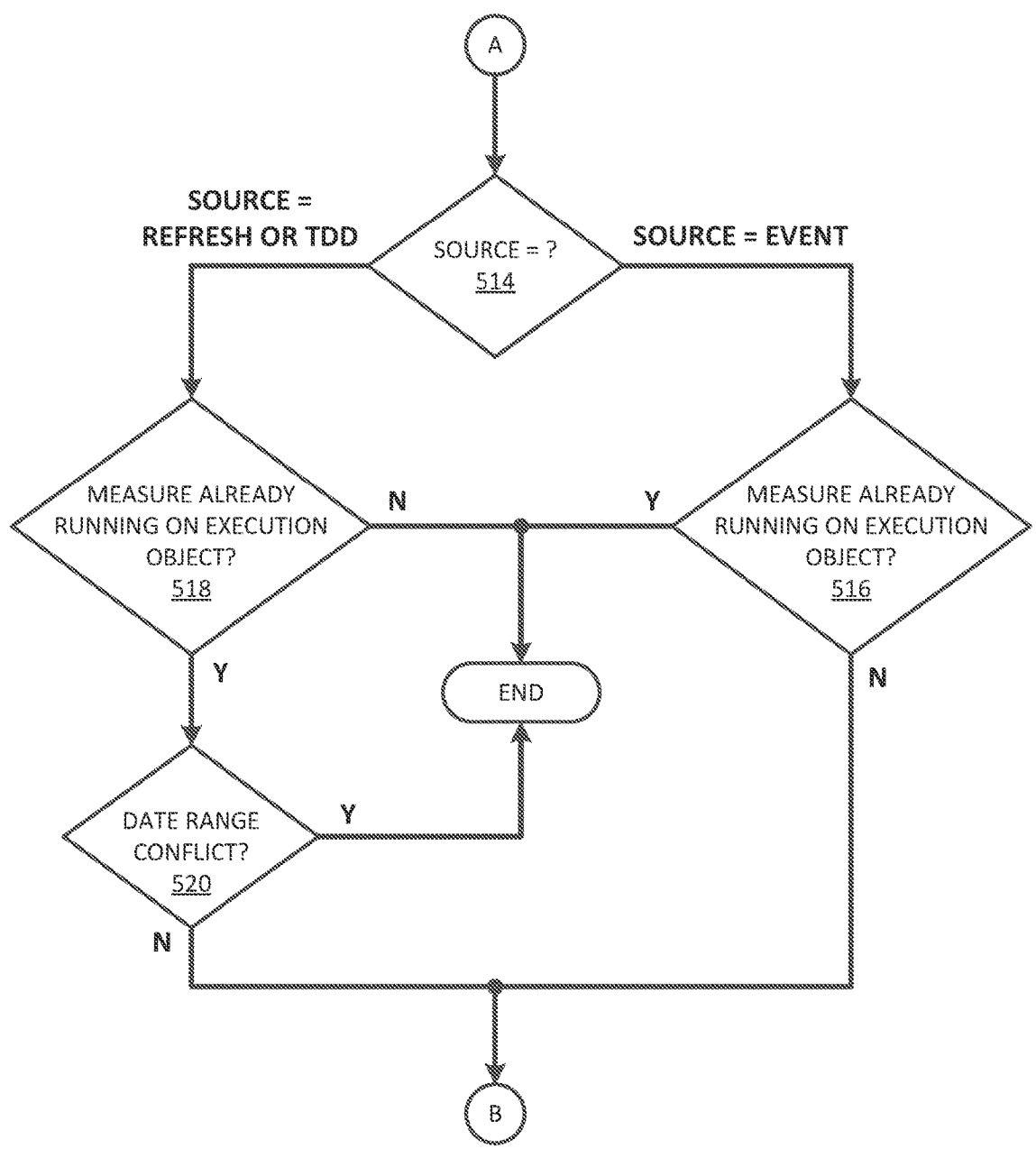
Figure 5C:
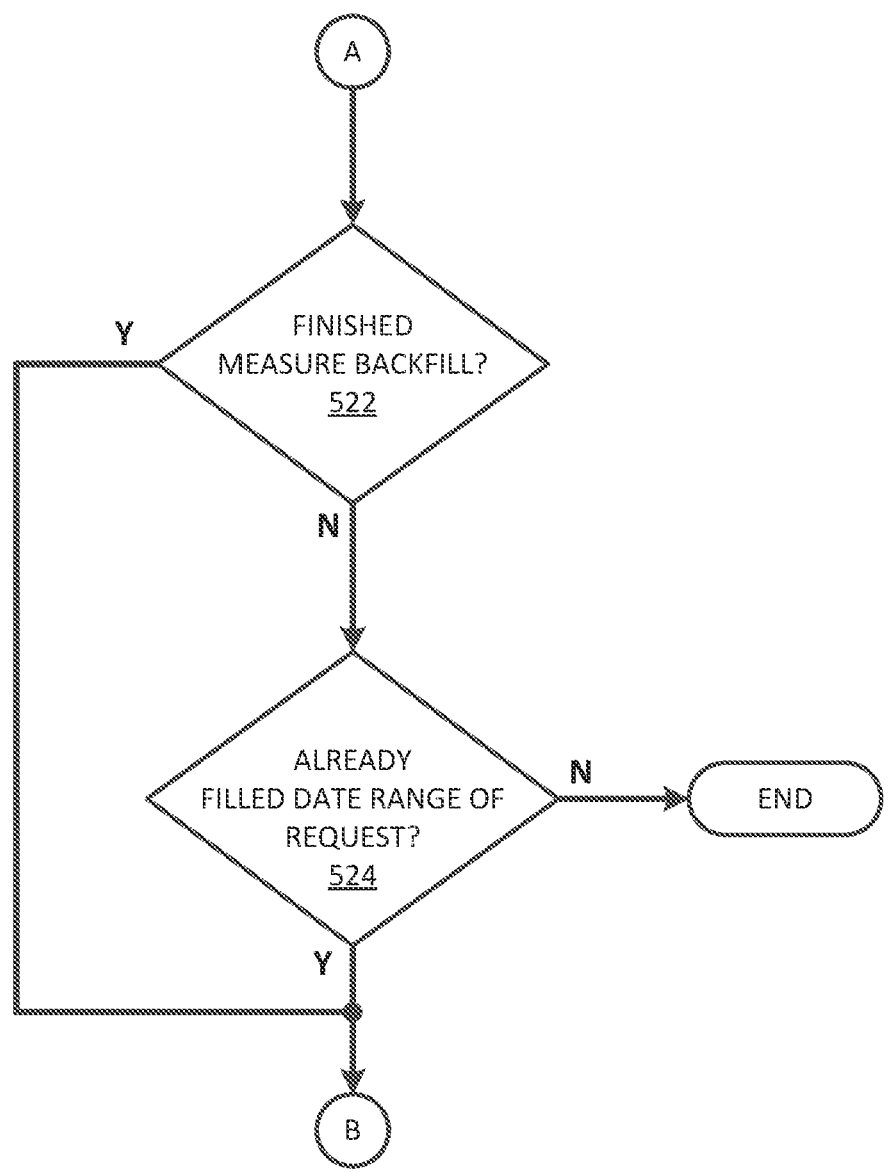

FIGS. 5A-C illustrate an exemplary process of identifying a list of one or more event queue items that can be processed in accordance with an aspect of the disclosure. In order to identify which event queue items can be processed, event manager process 204 runs a check against each pending event queue item in order to prevent logical conflicts against current data in execution object 214 and measure backfill object 216 in accordance with an aspect of the disclosure. Details regarding the conflict checks performed by event manager process 204 is dependent upon whether the event queue item is a refresh request (e.g., for a dimension or a measure) or a measure request with a date range.

Referring to FIG. 5A, event manager process 204 determines whether the event queue item is a refresh request at step 502. When event manager process 204 determines the event queue item is a refresh request, the process continues to step 504. At step 504, event manager process 204 determines whether the refresh request event queue item is for a dimension or a measure. When the request is for a dimension, event manager process 204 determines whether execution object 214 is running against that dimension at step 506. When the refresh request event queue item is for a dimension, it can only be dequeued if execution object 214 is not running against the same dimension regardless of the source (e.g., Event, Scheduler, TDD). When event manager process 204 determines execution object 214 is running against the same dimension as the request, the dequeuing process ends. But when event manager process 204 determines execution object 214 is not running against the same dimension as the request, the dequeuing process continues to group the dimension with other event queue items as further described herein.

Referring further to FIG. 5A, when event manager process 204 determines the request is for a measure at step 504, the process continues to step 508. When the request is for a measure, event manager process 204 determines whether execution object 214 is running against that measure at step 508. When the refresh request event queue item is for a measure, it can only be dequeued if execution object 214 is not running against the same measure having a source of Event or Scheduler. When the source of an event queue item is TDD then that item can be dequeued. When event manager process 204 determines execution object 214 is running against the same measure as the request, the dequeuing process ends. When event manager process 204 determines execution object 214 is not running against the same measure as the request, the process continues to step 510 to check the source of the measure. When event manager process 204 determines the measure has a source of Event or Schedule, the dequeuing process ends. But when event manager process 204 determines the measure has a source of TDD, the dequeuing process continues to group the measure with other event queue items as further described herein.

Returning to step 502 of FIG. 5A, when event manager process 204 determines the event queue item is not a refresh request, the process continues to step 512. When event manager process 204 determines the event queue item is not a measure request with a date range at step 512, the dequeuing process ends. When event manager process 204 determines the event queue item is a measure request with a date range at step 512, the current event queue measure item can only be dequeued if at least one of four situations exists.

A first situation in which an event queue measure item with a date range can be dequeued is if the measure has a source of Event and the same measure is not already running on execution object 214. Referring to FIG. 5B, event manager process 204 determines the source of the current event queue measure item at step 514. When the source is Event, event manager process 204 determines whether the same measure is already running on execution object 214 at step 516. When event manager process 204 determines the same measure having a source of Event is already running on execution object 214, the dequeuing process ends. But when event manager process 204 determines the same measure having a source of Event is not already running on execution object 214, the dequeuing process continues to group the current event queue measure item with other event queue items as further described herein.

A second situation in which an event queue measure item with a date range can be dequeued is if the same measure having a source of Refresh or TDD is running on execution object 214 and there is no date range conflict. Returning to step 514 of FIG. 5B, when the source is either Refresh or TDD, event manager process 204 determines whether the same measure is already running on execution object 214 at step 518. When event manager process 204 determines the same measure having a source of either Refresh or TDD is not already running on execution object 214, the dequeuing process ends. When event manager process 204 determines the same measure having a source of either Refresh or TDD is already running on execution object 214 the process continues to step 520. When event manager process 204 determines, at step 520, there is a date range conflict between the current event queue measure item and the measure already running on execution object 214, the dequeuing process ends. But when event manager process 204 determines there is not a date range conflict between the current event queue measure item and the measure already running on execution object 214, the dequeuing process continues to group the current event queue measure item with other event queue items as further described herein.

A third situation in which an event queue measure item with a date range can be dequeued is if the same measure has finished its measure backfill process. Referring to FIG. 5C, event manager process 204 determines whether the same measure has finished its measure backfill process (e.g., measure backfill process 210) at step 522. When event manager process 204 determines the same measure has finished its measure backfill process, the dequeuing process continues to group the current event queue measure item with other event queue items as further described herein.

A fourth situation in which an event queue measure item with a date range can be dequeued is if the same measure is actively running on measure backfill process 210 and the current plan (e.g., the currently executing time range of measure backfill process 210) has already filled the date range of the event queue measure item. Returning to step 522 of FIG. 5C, when event manager process 204 determines the same measure has not finished its measure backfill process (i.e., it is actively running), the process continues to step 524. When event manager process 204 determines the current plan has not already filled the date range of the event queue measure item at step 524, the dequeuing process ends. When event manager process 204 determines the current plan has already filled the date range of the event queue measure item, the dequeuing process continues to group the current event queue measure item with other event queue items as further described herein. In an embodiment, event manager process 204 verifies that the last planned execution time of measure backfill process 210 (e.g., LastExecutionPlanEndTimeUtc) is before the date range start time of the event queue measure item because measure backfill process 210 runs backwards in time.

Figure 6:
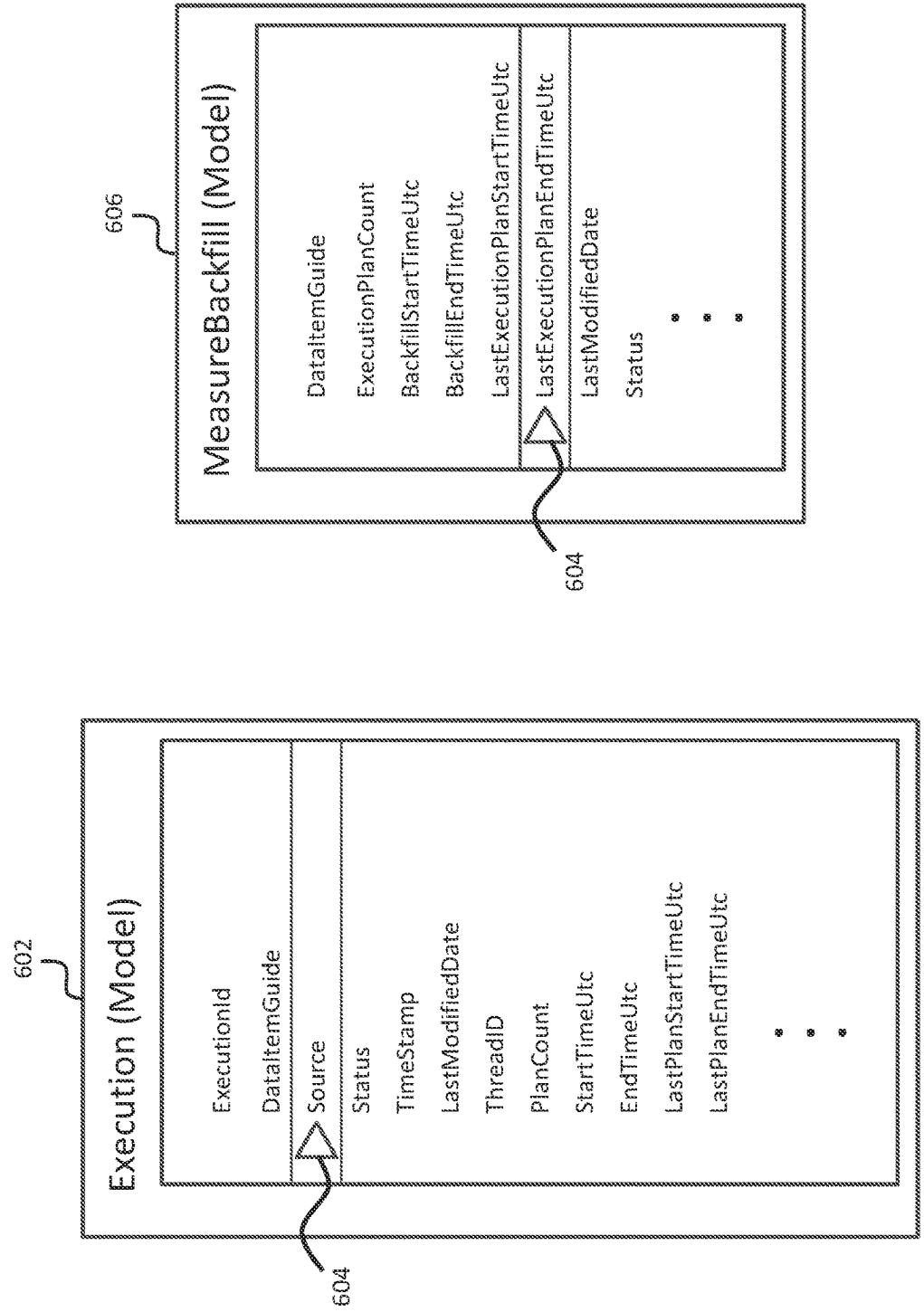
FIG. 6 illustrates an exemplary graphical user interface representation of objects according to an embodiment.

FIG. 6 illustrates an exemplary representation of an execution object and a measure backfill object on a graphical user interface (GUI) in accordance with an aspect of the disclosure. An execution GUI object 602 comprises one or more properties, such as an execution identifier (e.g., ExecutionId), a data item identifier (e.g., DataItemGuid), a source, and the like. In an embodiment, execution GUI object 602 corresponds to execution object 214 and the properties of execution GUI object 602 comprise properties of execution object 214. The execution GUI object 602 also comprises a selector 604 in accordance with an embodiment of the disclosure. The selector 604 enables a user of a user device (e.g., tablet computing device, workstation, smartphone, etc.) to select one of the properties that comprise execution GUI object 602 via a mouse and/or a touchscreen, for example. In the embodiment of execution GUI object 602 illustrated by FIG. 6, selector 604 is currently selecting the Source property.

A measure backfill GUI object 606 comprises one or more properties, such as a backfill start time (e.g., BackfillStartTimeUtc), a backfill end time (e.g., BackfillEndTimeUtc), a planned start time of a last execution (e.g., LastExecutionPlanStartTimeUtc), a planned end time of a last execution (e.g., LastExecutionPlanEndTimeUtc), and the like. In an embodiment, measure backfill GUI object 606 corresponds to measure backfill object 216 and the properties of measure backfill GUI object 606 comprise properties of measure backfill object 216. In another embodiment, measure backfill GUI object 606 comprises selector 604, which enables selection of properties of measure backfill GUI object 606 as described above.

Figure 7:
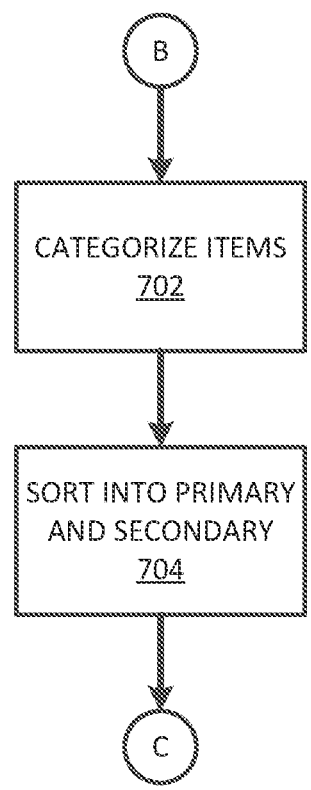
FIG. 7 illustrates an exemplary process to group event queue items according to an embodiment.

FIG. 7 illustrates an exemplary process of grouping event queue items into primary event queue items and secondary event queue items in accordance with an aspect of the disclosure. Once the list of event queue items has been identified as further described herein, event manager process 204 categorizes similar items into at least two distinct groups. At step 702, event manager process 204 categorizes event queue items as being either refresh requests (i.e., event requests without a date range) or date range requests. In an embodiment, the result of the categorization is a group of refresh request event queue items and a group of date range request event queue items. Proceeding to step 704, event manager process 204 sorts, for each of the categorized groups, dimensions and measures into primary event queue items and secondary event queue items. In an embodiment, event manager process 204 sorts the dimensions and measures by considering which item of a group should be processed first (e.g., the primary event queue item) and which one or more items of the group can be consolidated with the primary event queue item (e.g., secondary event queue items). In an exemplary embodiment, event manager process 204 considers which event queue item should be processed first and which event queue items can be consolidated based on a time parameter associated with the event queue items. In an embodiment, event manager process 204 sorts event queue items in a FIFO order.

Table 1 includes an exemplary refresh request dimension event queue item (e.g., Dimension A), refresh request measure event queue item (e.g., Measure X), and date range request measure event queue item (e.g., Measure Y) each having a time parameter associated therewith.

TABLE 1

| Event Queue Item | Request Type | Timestamp | Status |
| --- | --- | --- | --- |
| Dimension A | Refresh | 14:00:00.000 | Primary |
| Dimension A | Refresh | 14:24:00.000 | Secondary |
| Dimension A | Refresh | 14:26:00.000 | Secondary |
| Measure X | Refresh | 14:01:00.000 | Primary |
| Measure X | Refresh | 14:02:00.000 | Secondary |
| Measure Y | Date Range | 14:30:00.000 | Primary |
| Measure Y | Date Range | 14:32:00.000 | Secondary |

In the exemplary embodiment of Table 1, event manger process 204 sorts the Dimension A event queue items having timestamps of 14:24:00.000 and 14:26:00.000 as secondary event queue items because they can be consolidated with the Dimension A event queue item having a timestamp of 14:00:00.000 (i.e., the primary event queue item). In an embodiment, the timestamp comprises a time when each event queue item was added to the queue and does not change. The event queue items in Table 1 are grouped by item type (e.g., Dimension A, Measure X, Measure Y) and sorted by earliest time to determine the primary event queue item of each item type. After sorting the event queue items at step 704, the dequeuing process continues to identify which secondary event queue items can be consolidated with primary event queue items as further described herein.

Figure 8:
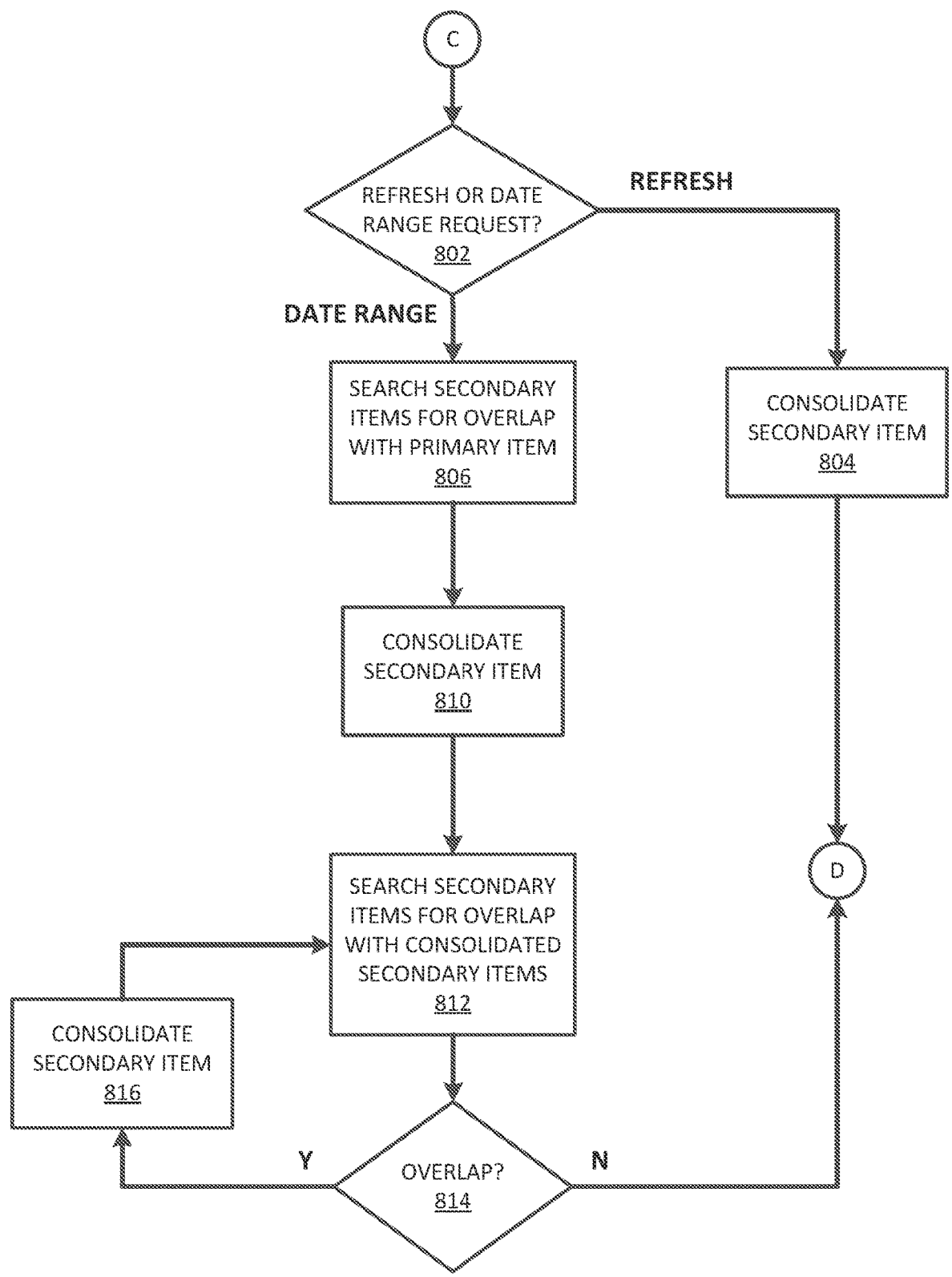
FIG. 8 illustrates an exemplary process to identify event queue items that can be consolidated according to an embodiment.

FIG. 8 illustrates an exemplary process of identifying secondary event queue items that can be consolidated with primary event queue items in accordance with an aspect of the disclosure. Beneficially, event manager process 204 consolidates (e.g., bundles together) event queue items based on groups that have been identified to reduce the workload on the runtime engine (e.g., runtime services 112) which reduces utilization of processing (e.g., processor 108) resources. In accordance with an aspect of the disclosure, event requests for dimensions and measures that do not have a date range (i.e., no start and end dates) are consolidated into one event request when the procedure (e.g., Model.usp_GetEventRequestItems) is called. In an embodiment, these event requests are consolidated into one request because they are essentially requests to refresh the data item.

At step 802 of FIG. 8, event manager process 204 determines whether a current group of one or more event queue items is of the refresh request type or the date range request type. When event manager process 204 determines the current group of event queue items is of the refresh request type, the process continues to step 804. Because nothing differentiates event queue items of the refresh request type, event manager process 204 consolidates the secondary event queue items of the current group at step 804. With respect to the exemplary embodiment depicted in Table 1 above, all Dimension A event queue items of the refresh type can be consolidated into one item because nothing differentiates them. The Dimension A event queue item with the Primary status is returned to the caller of the procedure (e.g., usp_GetEventQueueItems) and the Dimension A event queue items with the Secondary status are consolidated and deleted as further described herein. Referring further to the exemplary embodiment depicted in Table 1, the Measure X event queue item with Primary status is returned and the Measure X event queue item with Secondary status is consolidated and deleted. After consolidating the secondary event queue items of the refresh request type at step 804, the dequeuing process continues to delete consolidated event queue items and return a result set of event queue items as further described herein.

Returning to step 802 of FIG. 8, when event manager process 204 determines the current group of event queue items is of the date range request type, the process continues to step 806. In accordance with an aspect of the disclosure, event requests for measures with date ranges that are further down the queue, called secondary event queue items, are evaluated against the event request about to be dequeued, called the primary event queue item, based on FIFO priority. If any of the secondary event queue items include a date range that overlaps the date range of the primary event queue item, then the date range of the primary event queue item may be extended (e.g., widened) based on the date range of the overlapping secondary event queue item. In an embodiment, this evaluation takes place for each secondary event queue item against the primary event queue item. When the date range of a secondary event queue item contributes to extending the date range of the primary event queue item, the secondary event queue item will be deleted from the event queue because the date range of that item has been consolidated with (i.e., covered by) the primary event queue item. In an embodiment in which an event queue history is enabled, the consolidated secondary event queue item will have a status of "consolidated by {event queue ID of the primary event queue item}" as further described herein.

There are two levels of consolidating event queue items of the date range refresh type. The first level is based on a start time and an end time of the primary event queue item. The exemplary embodiment illustrated by FIG. 9 includes a timeline of a primary event queue item and secondary event queue items. The collection of individual squares (e.g. both crosshatch and non-shaded) for the primary event queue item comprise a measure timeline and the squares with crosshatch shading comprise the date range of the primary event queue item. In the illustrated embodiment, the start time of the primary event queue item is 14:03 and the end time is 14:05. The collection of squares with hatching for each secondary event queue item comprises the date range of each secondary event queue item. In the illustrated embodiment, the start time of the first secondary event queue item is 14:02 and the end time is 14:04, and the start time of the second secondary event queue item is 14:03 and the end time is 14:06.

Returning to step 806 of FIG. 8, event manager process 204 searches at the first level for one or more secondary event queue items having a date range that overlaps any portion of the date range of the primary event queue item which can qualify them to be consolidated based on the primary event queue item. In the exemplary embodiment illustrated by FIG. 9, event manager process 204 would determine the first secondary event queue item and the second secondary event queue item can be consolidated because the date range of each overlaps at least a portion of the date range of the primary event queue item. The event manager process 204 would determine that the third secondary event queue item (e.g., start time and end time of 14:00) and the fourth secondary event queue item (e.g., start time of 14:00 and end time of 14:02) cannot be consolidated because they do not overlap the primary event queue item and each would remain on the event queue.

Referring again to FIG. 8, when event manager process 204 determines that at least one secondary event queue item overlaps the primary event queue item, it consolidates the overlapping secondary event queue item at step 810. The process then continues to the second level of consolidating event queue items at step 812.

With continued reference to FIG. 8, the second level of consolidating event queue items comprises extending the date range of concern to include the date ranges of secondary event queue items that have already been consolidated with the primary event queue item. In an embodiment, event manager process 204 runs multiple passes over the list of event queue items that can be processed. In an embodiment, event manager process 204 keeps searching for overlapping date ranges and expanding the primary event queue item until there are no secondary event queue items left that do not overlap with the primary event queue item. Additionally and/or alternatively, event manager process 204 searches for overlapping date ranges in batches which results in an optimized time range to process rather than many time ranges. Continuing the above example illustrated by FIG. 9, after the first and second secondary event queue items have been consolidated with the primary event queue item at step 810, the date range of concern is widened to have a start time of 14:02 and an end time of 14:06. In other words, the date range begins at the earliest start time of the consolidated event queue items (e.g., 14:02 start time of the first secondary event queue item) and ends at the latest end time of the consolidated event queue items (e.g., 14:06 end time of the second secondary event queue item).

Referring again to FIG. 8, event manager process 204 searches at the second level for one or more secondary event queue items having a date range that overlaps any portion of the widened date range at step 812. Continuing to step 814, event manager process 204 determines whether any secondary event queue items overlap at the second level. When event manager process 204 determines that no secondary event queue items overlap the widened date range, the dequeuing process continues to delete consolidated event queue items and return a result set of event queue items as further described herein. When event manager process 204 determines that at least one secondary event queue item overlaps the widened date range, it consolidates the at least one overlapping secondary event queue item at step 816 and widens the date range of concern again to include the overlapping secondary event queue item before continuing back to step 812.

Figure 9:
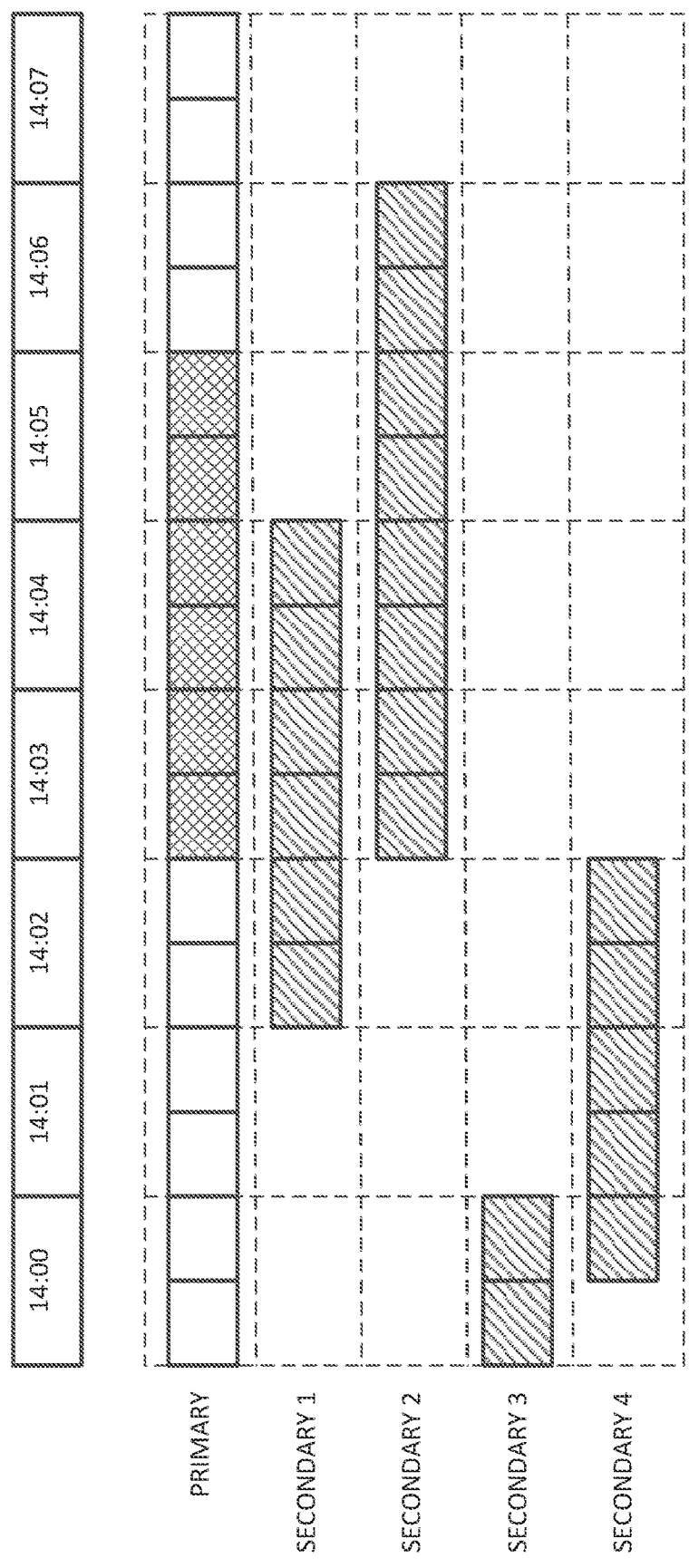
FIG. 9 illustrates an exemplary event queue item timeline according to an embodiment.

Continuing the above example illustrated by FIG. 9, event manager process 204 determines at step 814 (FIG. 8) that the fourth secondary event queue item overlaps the widened date range. The event manager process 204 then consolidates the fourth secondary event queue item and widens the date range to have a start time of 14:00 (e.g., the start time of the fourth secondary event queue item) and an end time of 14:06 (e.g., still the end time of the second secondary event queue item) at step 816 (FIG. 8). Repeating the process, event manager process 204 determines that the third secondary event queue item now overlaps the widened date range (e.g., the fourth secondary event queue item bridges the time range into the third secondary event queue item).

Figure 10:
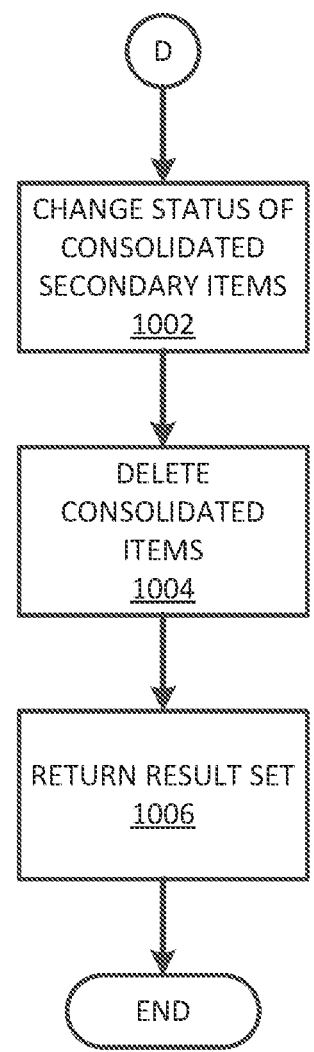
FIG. 10 illustrates an exemplary process to delete event queue items and return a set of event queue items according to an embodiment.

FIG. 10 illustrates an exemplary process of deleting consolidated secondary event queue items and returning a distinct set of event queue items in accordance with an embodiment of the disclosure. At step 1002, event manager process changes the status of consolidated secondary event queue items. After the consolidation process has determined which secondary event queue items have been consolidated with a corresponding primary event queue item, the start time and/or end time of the primary event queue may have changed in order to accommodate the consolidated secondary event queue items. In an exemplary embodiment, consolidated secondary event queue items briefly change status from "pending" to "consolidated by {event queue ID of the primary event queue item}." After the status is changed, event manager process 204 deletes the consolidated secondary event queue items at step 1004. An exemplary benefit of changing the status before deleting the secondary event queue items is to allow an optional database trigger to contain the status information. At step 1006, event manager process 204 returns a result set containing only the primary event queue items before the dequeuing process ends.

Example

Table 2 includes three event queue items with date ranges for the same measure and in a pending status.

TABLE 2

| EventQueueId | TimeStamp | DataItemGuid | StartTimeUtc | EndTimeUtc | Status |
|---|---|---|---|---|---|
| 8854329E-063 | 01:10:26 | 16F43ADC-C46 | 13:00:00 | 15:00:00 | Pending |
| DEDCE081-54 | 01:10:26 | 16F43ADC-C46 | 13:40:00 | 16:00:00 | Pending |
| 7AF2FDAD-BA | 01:10:26 | 16F43ADC-C46 | 11:40:00 | 15:59:00 | Pending |

Because the second and third event queue items overlap with the first event queue item (e.g., the primary event queue item), the start time of the primary event queue item changes from 13:00 to 11:40 and the end time of the primary event queue item changes from 15:00 to 16:00 and it gets dequeued. The result set of calling the procedure (e.g., Model.usp_GetEventQueueItems) results in the set of Table 3.

TABLE 3

| EventQueueId | TimeStamp | DataItemGuid | StartTimeUtc | EndTimeUtc |
|---|---|---|---|---|
| 8854329E-063 | 01:10:26 | 16F43ADC-C46 | 11:40:00 | 16:00:00 |

The event queue history table illustrated in Table 4 (e.g., the trigger is enabled) shows the status of the second and third event queue items changed causing an insert into History (e.g., row 1 and 2) and then got deleted with the new status, showing that it was consolidated by the primary event queue item. In an embodiment, the time values also include the date.

TABLE 4

| EventQueueId | TimeStamp | DataItemGuid | StartTimeUtc | EndTimeUtc | Status |
|---|---|---|---|---|---|
| 7AF2FDAD-BA | 01:10:26 | 16F43ADC-C46 | 11:40:00 | 15:59:00 | Pending |
| DEDCE081-54 | 01:10:26 | 16F43ADC-C46 | 13:40:00 | 16:00:00 | Pending |
| DEDCE081-54 | 01:10:26 | 16F43ADC-C46 | 13:40:00 | 16:00:00 | CONSOLIDATED BY 8854329E-063 |
| 7AF2FDAD-BA | 01:10:26 | 16F43ADC-C46 | 11:40:00 | 15:59:00 | CONSOLIDATED BY 8854329E-063 |
| 8854329E-063 | 01:10:26 | 16F43ADC-C46 | 13:00:00 | 15:00:00 | Pending |

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multiprocessor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the", and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for reducing processor resources comprising:
one or more computers comprising one or more processors and one or more non-transitory computer readable media, the one or more non-transitory computer readable media including instructions stored thereon that when executed cause the one or more computers to implement:
an event service process configured to receive one or more user-requested events to execute a measure or dimension from a client user device;
an event manager process executing on a server computing device adapted to interact with the event service process for adding the one or more user-requested events;
wherein the event manager process is configured to execute, by the one or more processors, the one or more user-requested events on a first in, first out order;
wherein the event manager process is configured to synchronize, by the one or more processors, one or more system events with the one or more user-requested events;
wherein the event manager process is configured to place, by the one or more processors, the one or more user-requested events on a wait when a time period until a system event for the time period completes; and
wherein the event manager process is configured to consolidate, by the one or more processors, the one or more system events and the one or more user-requested events into a primary event to avoid redundant processing; and
a runtime environment configured to execute, by the one or more processors, one or more model objects based on the primary event.

2. The system of claim 1,
wherein the one or more system events comprise a periodic schedule.

3. The system of claim 2,
wherein the one or more user-requested events comprise one or more aperiodic requests.

4. The system of claim 3,
wherein the one or more system events comprise a system refresh request event; and
wherein the one or more user-requested events each comprise a user refresh request event.

5. The system of claim 3,
wherein the one or more system events comprise a system date range;
wherein the one or more user-requested events comprise a user date range; and
wherein the system date range and the user date range at least partially overlap.

6. The system of claim 1,
wherein the system is configured to consolidate the one or more system events and the one or more user-requested events into the primary event based on one or more of object type, object identification numbers, and target time ranges.

7. The system of claim 1,
wherein the system consolidating the one or more system events and the one or more user-requested events into the primary event does not require users to manually adjust event time ranges.

8. The system of claim 1,
wherein the system is configured to consolidate the one or more system events and the one or more user-requested events by designating primary events and secondary events based on time ranges.

9. The system of claim 8,
wherein the system is configured to consolidate the one or more system events and the one or more user-requested events by considering a current execution status of the one or more model objects to ensure that events which cannot participate in the consolidation are processed without being affected by one or more consolidation operations.

10. The system of claim 8,
wherein the system is configured to consolidate the one or more system events and the one or more user-requested events by considering event time ranges that fully overlap, partially overlap, and/or are adjacent.

11. The system of claim 1, wherein the primary event includes all events being consolidated without any loss of data.

12. The system of claim 1, the one or more non-transitory computer readable media including further instructions stored thereon that when executed cause the one or more computers to: purge, by the one or more processors, any of the one or more system events and the one or more user-requested events that are in a pending status for a same model object.

13. The system of claim 12, the one or more non-transitory computer readable media including further instructions stored thereon that when executed cause the one or more computers to: update, by the one or more processors, a status of the same model object to reflect a purged identifier.

14. The system of claim 12, wherein the purge includes deleting records of the one or more system events and the one or more user-requested events from an events table.

15. The system of claim 1, the one or more non-transitory computer readable media including further instructions stored thereon that when executed cause the one or more computers to: determine, by the one or more processors, whether an event request of the one or more system events and the one or more user-requested events is for a measure or a dimension.

16. The system of claim 15, wherein, when the event request is for the dimension, the event request is dequeued via a dequeuing process.

17. The system of claim 15, wherein, when the event request is for the measure, the system is configured to determine if the measure includes a date range.

18. The system of claim 15, wherein the system is configured to consolidate dimensions and measures separately into one of at least three categories: a dimensions category, a measures without a date range category, and a measures with a date range category.

* * * * *